US012722227B2

(12) United States Patent
Jiang et al.

(10) Patent No.: US 12,722,227 B2
(45) Date of Patent: Sep. 1, 2026

(54) LENS BARREL AND LASER CUTTING HEAD

(71) Applicant: GANGCHUN LASER TECHNOLOGY (JIANGSU) CO., LTD, Jiangsu (CN)

(72) Inventors: Xiuqing Jiang, Jiangsu (CN); Xiaojie Zhu, Jiangsu (CN)

(73) Assignee: Gangchun Laser Technology (Jiangsu) Co., Ltd., Jiangsu (CN)

( * ) Notice: Subject to any disclaimer, the term of this patent is extended or adjusted under 35 U.S.C. 154(b) by 813 days.

(21) Appl. No.: 18/041,640

(22) PCT Filed: Jun. 28, 2022

(86) PCT No.: PCT/CN2022/101730

§ 371 (c)(1),
(2) Date: Feb. 14, 2023

(87) PCT Pub. No.: WO2022/242781

PCT Pub. Date: Nov. 24, 2022

(65) Prior Publication Data

US 2023/0321754 A1 Oct. 12, 2023

(30) Foreign Application Priority Data

May 18, 2021 (CN) ......................... 202110537310.7

(51) Int. Cl.
*B23K 26/064* (2014.01)
*B23K 26/38* (2014.01)

(52) U.S. Cl.
CPC .......... *B23K 26/0648* (2013.01); *B23K 26/38* (2013.01)

(58) Field of Classification Search
CPC .............. B23K 26/0648; B23K 26/046; B23K 26/144; B23K 26/1464; B23K 26/1476;
(Continued)

(56) References Cited

U.S. PATENT DOCUMENTS 5,272,567 A 12/1993 Inoue
6,270,222 B1 * 8/2001 Herpst ............... G02B 27/0006 359/511

(Continued)

FOREIGN PATENT DOCUMENTS

CN 104551384 A 4/2015
CN 205342232 U 6/2016

(Continued)

OTHER PUBLICATIONS

Search Report issued to counterpart Application No. PCT/CN2022/101730 dated Sep. 22, 2022.

(Continued)

*Primary Examiner* — Vy T Nguyen
(74) *Attorney, Agent, or Firm* — McNees Wallace & Nurick

(57) ABSTRACT

Provided are a lens barrel and a laser cutting head. The lens barrel includes a barrel, a pair of window lenses, a collimating lens, a focusing lens, and a drive assembly. The barrel is provided with a channel penetrating through the barrel. The pair of window lenses are disposed at two ends of the channel in a one-to-one manner. A sealing portion configured to seal the channel is disposed between the pair of window lenses and the inner wall of the channel. The collimating lens and the focusing lens are disposed sequentially in the channel. The moving end of the drive assembly is capable of moving along the extension direction of the channel. The barrel is connected to the moving end of the drive assembly.

20 Claims, 9 Drawing Sheets

(58) Field of Classification Search

CPC ...... B23K 26/21; B23K 26/38; B23K 26/707; G02B 27/0006; G02B 7/028; G02B 7/04

USPC .......................................................... 219/121

See application file for complete search history.

(56) References Cited

U.S. PATENT DOCUMENTS

| | | | | |
|---|---|---|---|---|
| 6,353,203 | B1 * | 3/2002 | Hokodate | B23K 26/032 219/121.75 |
| 2011/0075274 | A1 | 3/2011 | Spoerl | |

FOREIGN PATENT DOCUMENTS

| | | | | |
|---|---|---|---|---|
| CN | 206065664 | U | | 4/2017 |
| CN | 207057865 | U | | 3/2018 |
| CN | 107876974 | A | | 4/2018 |
| CN | 208099628 | U | * | 11/2018 |
| CN | 208408924 | U | | 1/2019 |
| CN | 208758795 | U | | 4/2019 |
| CN | 110560927 | A | | 12/2019 |
| CN | 210306294 | U | | 4/2020 |
| CN | 210755878 | U | | 6/2020 |
| CN | 210967459 | U | | 7/2020 |
| CN | 211052884 | U | | 7/2020 |
| CN | 111515527 | A | | 8/2020 |
| CN | 112091451 | A | | 12/2020 |
| CN | 212191731 | U | | 12/2020 |
| CN | 113020787 | A | | 6/2021 |
| JP | 2012024810 | A | * | 2/2012 |
| JP | 2012024811 | A | | 2/2012 |
| JP | 2016539007 | A | | 12/2016 |
| WO | WO 2011004084 | A1 | * | 1/2011 |
| WO | 2022242781 | A1 | | 11/2022 |

OTHER PUBLICATIONS

Office Action to Chinese counterpart Application No. 202110537310.7 dated Jul. 5, 2021.

* cited by examiner

LENS BARREL AND LASER CUTTING HEAD

CROSS-REFERENCE TO RELATED APPLICATIONS

This is a National Stage Application filed under 35 U.S.C. 371 based on International Patent Application No. PCT/CN2022/101730, filed on Jun. 28, 2022, which claims priority to Chinese Patent Application No. 202110537310.7 filed on May 18, 2021, disclosures of both of which are incorporated herein by reference in their entireties.

TECHNICAL FIELD

The present application relates to the technical field of laser cutting equipment, for example, a lens barrel and a laser cutting head.

BACKGROUND

With the development of science and technology, laser cutting is widely used in metal cutting operations due to the characteristics of small thermal deformation of the material to be cut, non-contact processing, and flexible processing.

The thermal energy converted from the light energy of laser can be kept in a very small area, and a laser beam can have extremely strong energy at a very small action point after focusing. Therefore, when the laser beam is irradiated on a metal material, the heat input from the laser beam far exceeds the part reflected, conducted, or diffused by the metal material. The metal material is quickly heated to the point of vaporization and evaporates to form holes. With the relative linear movement between the beam and the material, the holes are continuous to form a cut, thereby implementing metal cutting.

During the laser cutting process of a metal, it is necessary to add an auxiliary vapor suitable for the material to be cut. The auxiliary vapor can not only be used as an oxidizing material for the material to be cut to produce an exothermic reaction, but also can help to blow off the slag in the cut.

In the related art, the focal length of the laser beam of a laser cutting head is adjusted by adjusting the distance between a collimating lens and a focusing lens. Because the environment of most laser cutting operations is poor, the laser cutting head is in a dusty environment, and smoke is generated during the cutting process. If particles in the dust and smoke enter the laser cutting head and are attached to the collimating lens or the focusing lens, the laser irradiates these particles, and thus a large amount of heat is generated by the particles. If these high-temperature particles are attached to a lens for a long time, the collimating lens or the focusing lens which is expensive is burned, causing low productive efficiency and high production cost.

SUMMARY

The present application provides a lens barrel and a laser cutting head capable of solving problems of low productive efficiency and high production cost caused by particles in smoke and dust entering the laser cutting head and damaging an expensive collimating lens or focusing lens.

In one aspect, the present application provides a lens barrel. The lens barrel includes a barrel, a pair of window lenses, a collimating lens, a focusing lens, and a drive assembly. The barrel is provided with a channel penetrating through the barrel. The pair of window lenses are disposed at two ends of the channel in a one-to-one manner. A sealing portion configured to seal the channel is disposed between the pair of window lenses and the inner wall of the channel. The collimating lens and the focusing lens are disposed sequentially in the channel. The moving end of the drive assembly is capable of moving along the extension direction of the channel. The barrel is connected to the moving end of the drive assembly.

In another aspect, the present application provides a laser cutting head. The laser cutting head includes an optical fiber assembly, a lens assembly, and a nozzle assembly disposed sequentially. The lens assembly includes the lens barrel as described above.

REFERENCE LIST

Figure 1:
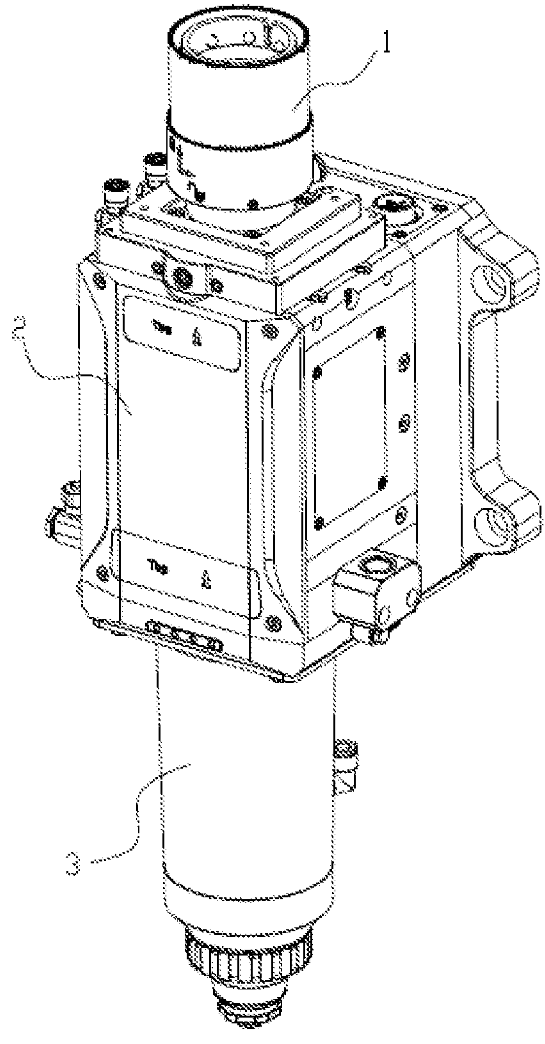
FIG. 1 is a diagram illustrating the structure of a laser cutting head according to an embodiment of the present application.
Figure 2:
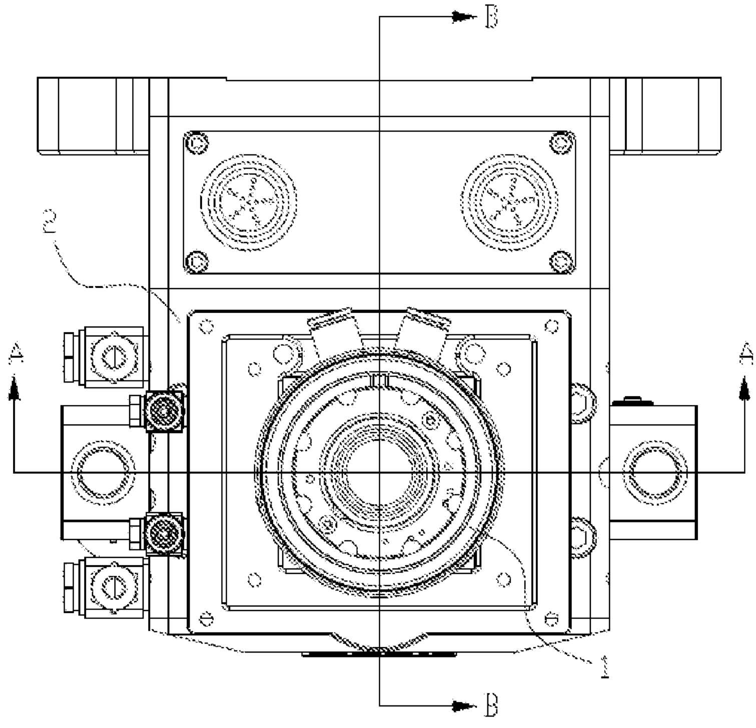
FIG. 2 is a top view of FIG. 1.

1 optical fiber assembly
11 first connection plate
2 lens assembly
211 frame body
2111 first port
2112 second port
2113 baseplate
2121 front cover plate
2122 side cover plate
2123 seal cover plate
213 cabin
214 base
22 barrel
221 collimating lens
222 focusing lens
223 water cooling channel
231 first adjustment module
2311 first pin
2312 first guide column
2313 first mounting hole
2314 first spring
232 second adjustment module
2321 second pin
2322 second guide column
2323 second mounting hole
2324 second spring
24 first sealing portion
241 first protective lens module
2411 first protective lens frame
2412 first protective lens
242 first annular groove
243 first sealing ring
25 second sealing portion
251 second protective lens module

2511 second protective lens frame
2512 second protective lens
252 second annular groove
253 second sealing ring
26 filter assembly
27 drive assembly
271 voice coil motor
272 cross roller guide
28 dust detection apparatus
281 air inlet
282 air outlet
291 window lens
292 end cover
293 third annular groove
294 third sealing ring
295 wave spring
3 nozzle assembly
31 second connection plate
4 water pipe joint
5 temperature sensor

DETAILED DESCRIPTION

In the description of the present application, unless otherwise expressly specified and limited, the term "connected to each other", "connected", or "secured" is to be construed in a broad sense, for example, as securely connected, detachably connected, or integrated; mechanically connected or electrically connected; directly connected to each other or indirectly connected to each other via an intermediary; or internally connected between two elements or interaction relations between two elements. For those of ordinary skill in the art, specific meanings of the preceding terms in the present application may be construed according to specific circumstances.

In the present application, unless otherwise expressly specified and limited, when a first feature is described as "on" or "below" a second feature, the first feature and the second feature may be in direct contact or be in contact via another feature between the two features instead of being in direct contact. Moreover, when the first feature is described as "on", "above", or "over" the second feature, the first feature is right on, above, or over the second feature or the first feature is obliquely on, above, or over the second feature, or the first feature is simply at a higher level than the second feature. When the first feature is described as "under", "below", or "underneath" the second feature, the first feature is right under, below, or underneath the second feature or the first feature is obliquely under, below, or underneath the second feature, or the first feature is simply at a lower level than the second feature.

In the description of the present application, it is to be noted that the orientations or position relations indicated by terms such as "above", "below", "right", and the like are based on orientations or position relations shown in the drawings. These orientations or position relations are intended only to facilitate and simplify description of the present application, and not to indicate or imply that a device or element referred to must have such specific orientations or must be configured or operated in such specific orientations. Thus, these orientations or position relations are not to be construed as limiting the present application. In addition, the terms "first" and "second" are used only to distinguish between descriptions and have no special meaning.

This embodiment provides a laser cutting head. The laser cutting head includes an optical fiber assembly 1, a lens assembly 2, and a nozzle assembly 3 disposed sequentially.

The lens assembly 2 includes a lens barrel. The lens barrel can adjust the focal point of a laser beam passing through the lens barrel and ensure the sealing performance of the lens barrel and the external environment at the same time. Thus, the service life of a collimating lens and a focusing lens is prolonged, and maintenance and replacement times of the collimating lens and the focusing lens are reduced, further improving productive efficiency and reducing production cost.

Figure 8:
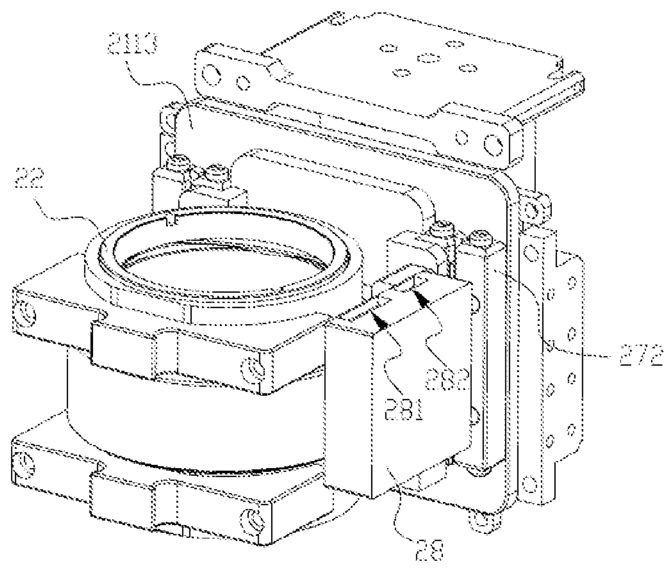
FIG. 8 is a diagram illustrating the structure of the lens assembly in FIG. 5 with a frame body and a cover plate removed.
Figure 9:
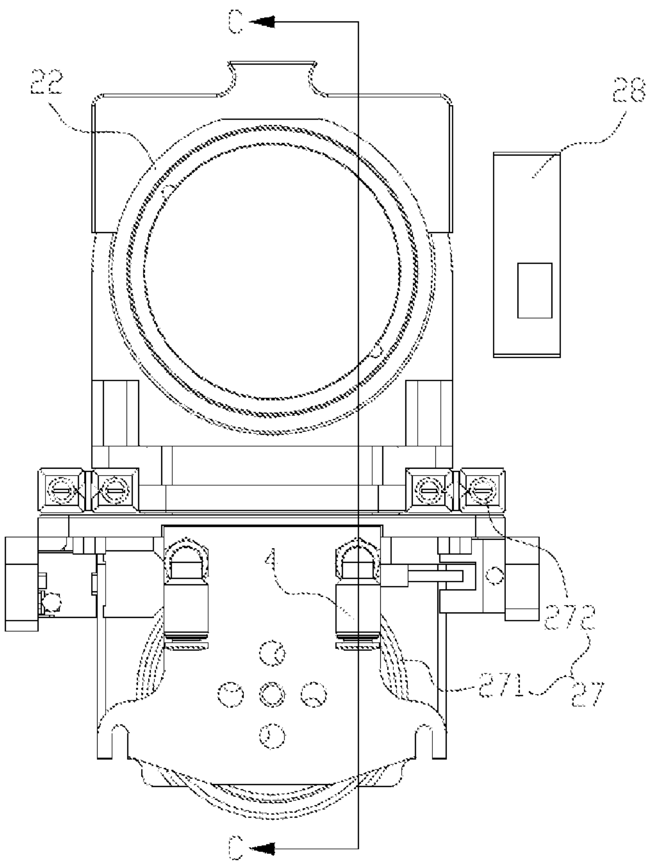
FIG. 9 is a bottom view of FIG. 8.
Figure 10:
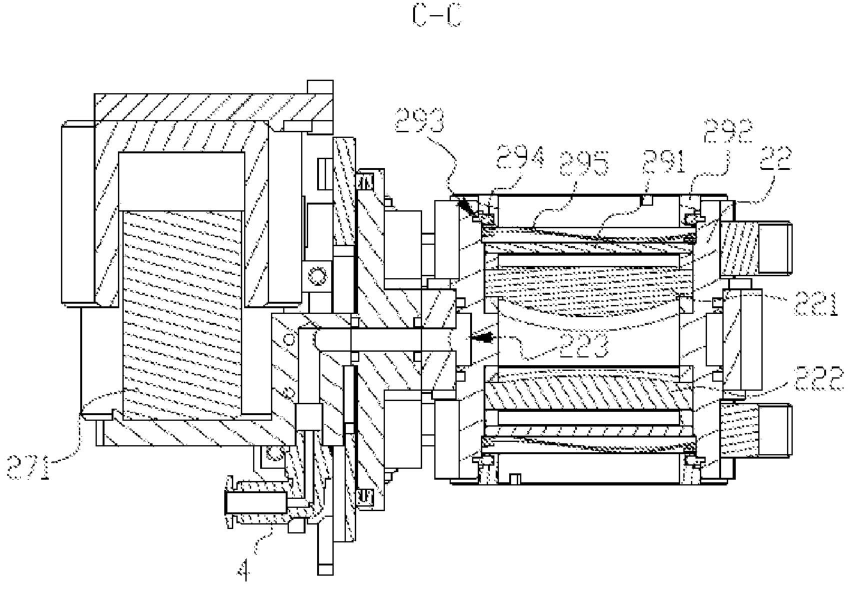
FIG. 10 is a section view taken along C-C of FIG. 9.

As shown in FIGS. 8 to 10, the lens barrel includes a barrel 22, a pair of window lenses 291, a collimating lens 221, a focusing lens 222, and a drive assembly 27. The barrel 22 is provided with a channel penetrating through the barrel 22. The pair of window lenses 291 are disposed at two ends of the channel in a one-to-one manner. A sealing portion configured to seal the channel is disposed between the pair of window lenses 291 and the inner wall of the channel. The collimating lens 221 and the focusing lens 222 are disposed sequentially in the channel. The moving end of the drive assembly 27 can move along the extension direction of the channel. The barrel 22 is connected to the moving end of the drive assembly 27. Thus, the focal point of a laser beam passing through the lens barrel can be adjusted, and the collimating lens 221 and the focusing lens 222 can be sealed in the channel at the same time, ensuring the sealing performance of the lens barrel and the external environment. Thus, the service life of the collimating lens 221 and the focusing lens 222 is prolonged, and maintenance and replacement times of the collimating lens 221 and the focusing lens 222 are reduced, further improving productive efficiency and reducing production cost.

According to the preceding structure, in an embodiment, to ensure the sealing stability of the sealing portion between a pair of window lenses 291 and the inner wall of a channel and reduce the influence of vibration on the pair of window lenses 291, wave springs 295 are disposed between end covers 292 and the window lenses 291. The wave springs 295 are pressed against the window lenses 291 by the end covers 292, thereby reducing the influence of vibration on the sealing portion between the pair of window lenses 291 and ensuring the sealing stability of the sealing portion between the pair of window lenses 291 and the inner wall of the channel.

In an embodiment, to prolong the service life of a collimating lens 221 and a focusing lens 222, the part of a barrel 22 located between the collimating lens 221 and the focusing lens 222 is provided with a water cooling channel 223. The inlet and the outlet of the water cooling channel 223 are separately connected to a water pipe joint 4 so that the collimating lens 221 and the focusing lens 222 can be continuously cooled during the operation of the laser cutting head. Thus, the collimating lens 221 and the focusing lens 222 can be kept at a lower temperature at all times, thereby prolonging the service life of the collimating lens 221 and the focusing lens 222.

To further improve the sealing performance of the laser cutting head, the laser cutting head can dispose the lens barrel in a sealed environment that is isolated from the outside, thereby forming a double-layer sealing structure outside the collimating lens 221 and the focusing lens 222. Hence, particles in dust and smoke in the external environment can be prevented from entering the laser cutting head, and the particles can be prevented from adhering to the collimating lens 221 or the focusing lens 222 which are more expensive. Moreover, the collimating lens 221 or the focusing lens 222 are prevented from being burned by particles in a high-temperature state after being irradiated by the laser, the service life of the collimating lens 221 and the focusing lens 222 is prolonged, the production cost is reduced, and the productive efficiency is improved.

As shown in FIGS. 1 to 7, in this embodiment, a laser cutting head includes an optical fiber assembly 1, a lens assembly 2, and a nozzle assembly 3 disposed sequentially. The lens assembly 2 includes a frame and a lens barrel disposed in the frame.

The upper top surface of the frame and the lower bottom surface of the frame are provided with a first port 2111 and a second port 2112, respectively. The fame is also provided with a first path communicating with the first port 2111 and the second port 2112. The lens barrel is disposed in the first path. The extension direction of the channel of the lens barrel is the same as the extension direction of the first path. The optical path in the optical fiber assembly 1 sequentially passes through a collimating lens 221 and a focusing lens 222 and then enters the nozzle assembly 3. The optical fiber assembly 1 is connected to the upper top surface of the frame by a first connection plate 11. The nozzle assembly 3 is connected to the lower bottom surface of the frame by a second connection plate 31.

Figure 3:
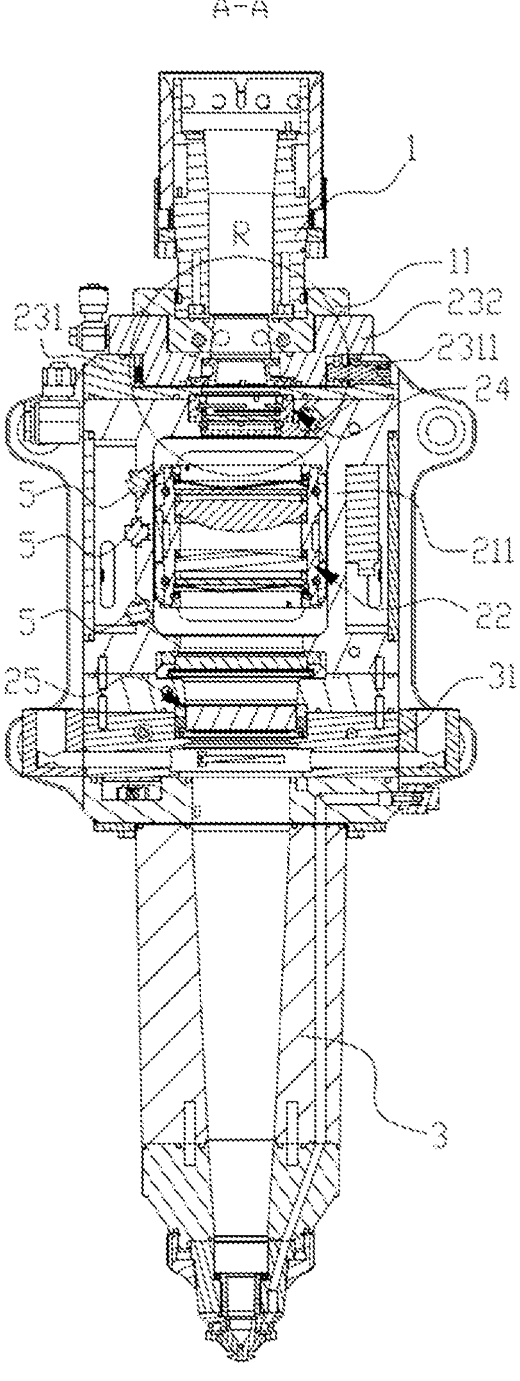
FIG. 3 is a section view taken along A-A of FIG. 2.
Figure 4:
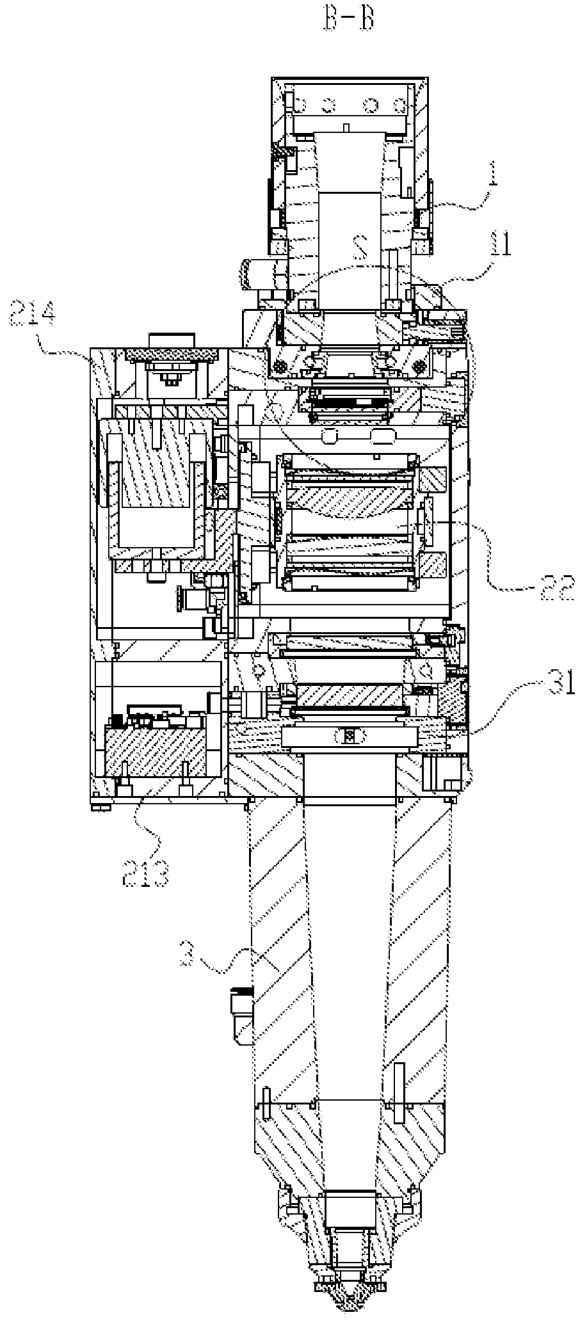
FIG. 4 is a section view taken along B-B of FIG. 2.
Figure 5:
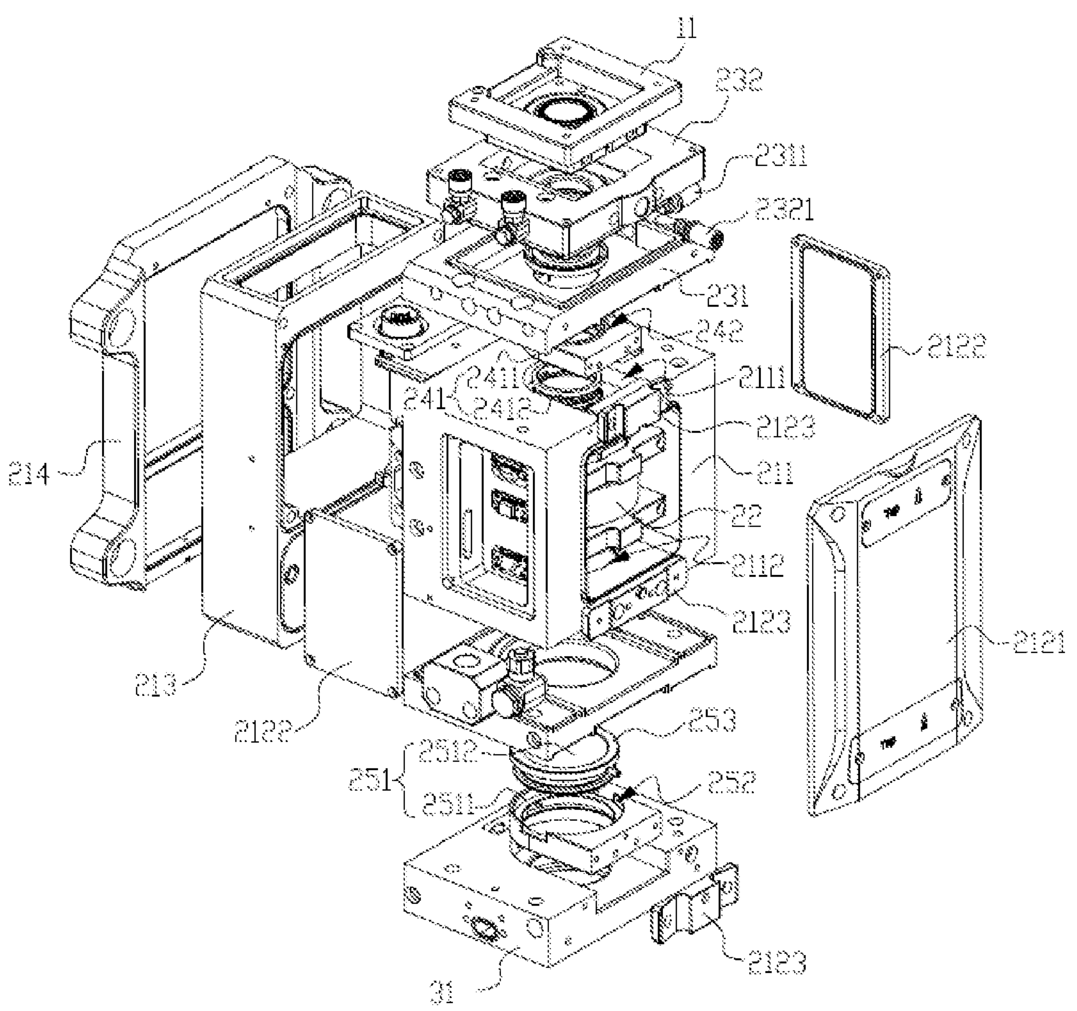
FIG. 5 is an exploded view of a lens assembly in FIG. 1.

To improve sealing property between the optical fiber assembly 1 and the lens assembly 2 and sealing property between the nozzle assembly 3 and the lens assembly 2, as shown in FIG. 3 and FIG. 5, the lens assembly 2 also includes a first sealing portion 24 and a second sealing portion 25. The first sealing portion 24 can seal the first port 2111 of the first path with the optical fiber assembly 1 when the optical path of the optical fiber assembly 1 is ensured to communicate with the first path. The second sealing portion 25 can seal the second port 2112 of the first path with the nozzle assembly 3 when the optical path of the first path is ensured to communicate with the nozzle assembly 3. Thus, an inner cavity in which the first path is sealed with the outside is formed in the frame, and the probability of particles in dust and smoke entering the first path is reduced.

In an embodiment, as shown in FIGS. 4 to 7, a first sealing portion 24 includes a first protective lens module 241, a pair of first annular grooves 242, a pair of first sealing rings 243, and a first connection plate 11. The first protective lens module 241 includes a first protective lens frame 2411 and a first protective lens 2412. The first protective lens 2412 is disposed in the mounting hole of the first protective lens frame 2411. The top and the bottom of the first protective lens module 241 are separately provided with a first annular groove 242. A pair of first sealing rings 243 are disposed in a pair of first annular grooves 242 in a one-to-one manner. The first connection plate 11 presses the first protective lens module 241 against a frame so that the pair of the first sealing rings 243 are pressed and limited in the pair of the first annular grooves 242 in a one-to-one manner by the first connection plate 11. Thus, sealing between an optical fiber assembly 1 and a lens assembly 2 is implemented.

A second sealing portion 25 includes a second protective lens module 251, a pair of second annular grooves 252, a pair of second sealing rings 253, and a second connection plate 31. The second protective lens module 251 includes a second protective lens frame 2511 and a second protective lens 2512. The second protective lens frame 2511 is provided with a through hole in which the second protective lens 2512 is placed. A pair of second annular grooves 252 are disposed on the top surface and bottom surface of the second protective lens frame 2511 located near the through hole in a one-to-one manner. The pair of second sealing rings 253 are disposed in the pair of second annular grooves 252 in a one-to-one manner. The second connection plate 31 presses the second protective lens module 251 against the bottom surface of the frame. The second sealing ring 253 located at the bottom of the second protective lens module 251 is pressed and limited in the second annular groove 252 located at the bottom surface of the second protective lens frame 2511 by the second connection plate 31. The second sealing ring 253 located at the top of the second protective lens module 251 is pressed and limited in the second annular groove 252 located at the top surface of the second protective lens frame 2511 by the pressure of the second connection plate 31 received by the second protective lens frame 2511. That is, the pair of second sealing rings 253 are pressed and limited in the pair of second annular grooves 252 in a one-to-one manner by the second connection plate 31.

As shown in FIG. 10, the sealing portion between a pair of window lenses 291 and the inner wall of a channel includes a pair of third annular grooves 293 and a pair of third sealing rings 294. Sidewalls of a pair of end covers 292 which separately abut the inner wall of a barrel 22 are separately provided with a third annular grooves 293. The pair of third sealing rings 294 are disposed in the pair of third annular grooves 293 in a one-to-one manner. Each third sealing ring 294 is pressed and limited in a corresponding third annular groove 293 by the inner wall of the barrel 22, thereby ensuring sealing property between the barrel 22 and the first path outside the barrel 22.

In an embodiment, to ensure sealing property between a first path and outside and facilitate the maintenance and replacement of each lens assembly, a frame includes a frame body 211 and a cover plate disposed on the frame body 211. The front surface of the frame body 211 is provided with a through hole for a barrel 22 to insert into the first path from the front surface, a through hole for a first protective lens module 241 to insert into the first path from the front surface, and a through hole for a second protective lens module 251 to insert into the first path from the front surface. The cover plate includes a front cover plate 2121 disposed on the front surface of the frame body 211, a pair of side cover plates 2122 disposed on the left side surface and right side surface of the frame body 211, and a seal cover plate 2123 disposed between the front surface of the frame body 211 and the front cover plate 2121.

A pair of seal cover plates 2123 are disposed on a pair of through holes in a one-to-one manner. The pair of through holes are used for the first protective lens module 241 and the second protective lens module 251 to insert into the first path from the front surface. End surfaces of the pair of seal cover plates 2123 facing the front surface of the frame body 211 are provided with a pair of annular grooves in a one-to-one manner. The pair of annular grooves are used for sealing the first protective lens module 241 and the second protective lens module 251 which are inserted into the first path from the front surface. Sealing rings are disposed in the pair of annular grooves in a one-to-one manner. The pair of seal cover plates 2123 press and limit the pair of sealing rings in the pair of annular grooves in a one-to-one manner.

A pair of recesses for accommodating a pair of seal cover plates 2123 in a one-to-one manner are disposed on the end surface of the front cover plate 2121 facing the front surface of the frame body 211. An annular groove is disposed on the plate body between the pair of recesses of the front cover plate 2121. The annular groove is used for sealing the barrel 22 which is inserted into the through hole in the first path from the front surface of the frame body 211. A sealing ring is disposed in the annular groove. When the front cover plate 2121 is mounted on the front surface of the frame body 211, the sealing ring located in the annular groove on the plate body of the front cover plate 2121 is pressed and limited in the annular groove by the front cover plate 2121. The front cover plate 2121 presses the pair of seal cover plates 2123 against the front surface of the frame body 211. This not only ensures the sealing property between the first path and the outside, but also facilitates the maintenance and replacement of the barrel 22, the first protective lens module 241, and the second protective lens module 251.

During the connection of an optical fiber assembly 1 and a lens assembly 2, the axis of the optical path of the optical fiber assembly 1 may deviate from the axis of the first path of the lens assembly 2 due to processing errors and assembly errors. Thus, part of light beams in the optical path of the optical fiber assembly 1 are irradiated on a first connection plate 11. This not only wastes energy, but also causes the temperature of the first connection plate 11 to be too high, thereby possibly causing the sealing of a first sealing portion 24 to fail.

To solve the preceding problems, the lens assembly 2 in this embodiment also includes a first adjustment module 231 and a second adjustment module 232. The first adjustment module 231 and the second adjustment module 232 are sequentially disposed between the first connection plate 11 and the frame. The first adjustment module 231 is secured to the top of the frame. The second adjustment module 232 is connected to the moving end of the first adjustment module 231. The first connection plate 11 is connected to the moving end of the second adjustment module 232. The moving end of the first adjustment module 231 can move along a first horizontal direction. The moving end of the second adjustment module 232 can move along a second horizontal direction perpendicular to the first horizontal direction.

Figure 6:
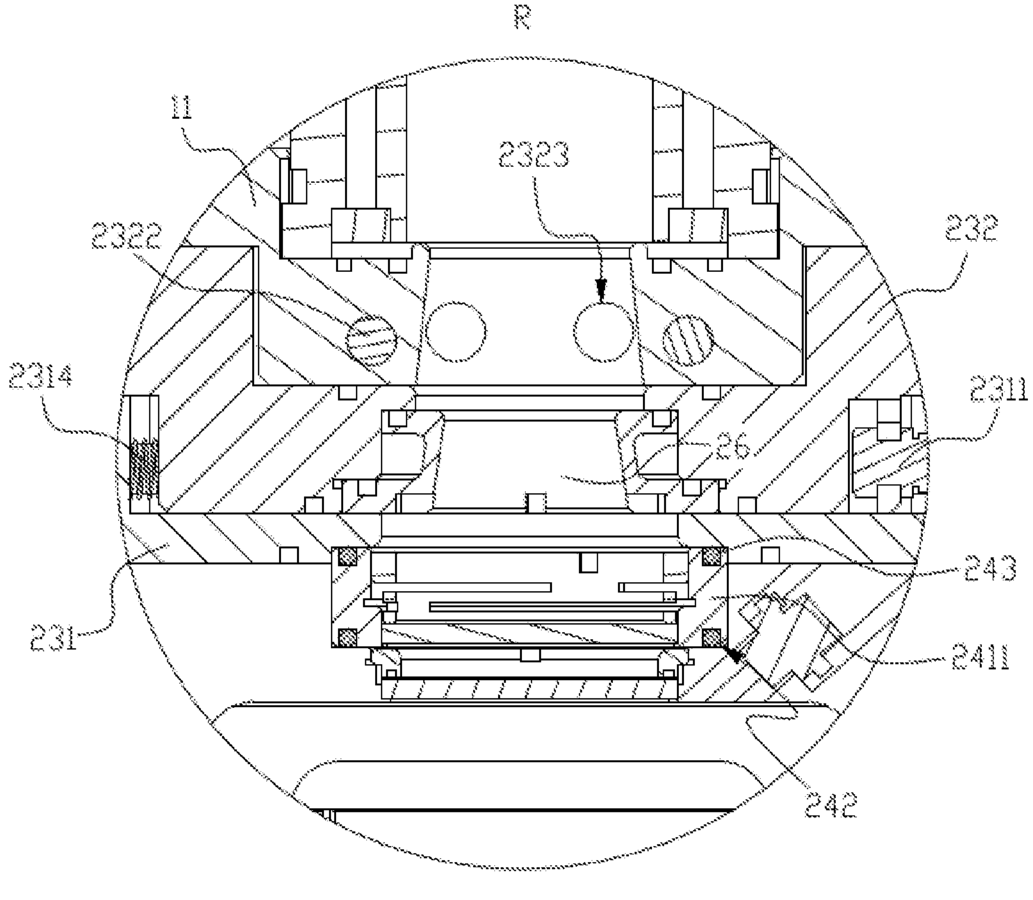
FIG. 6 is a partial view at R in FIG. 3.
Figure 7:
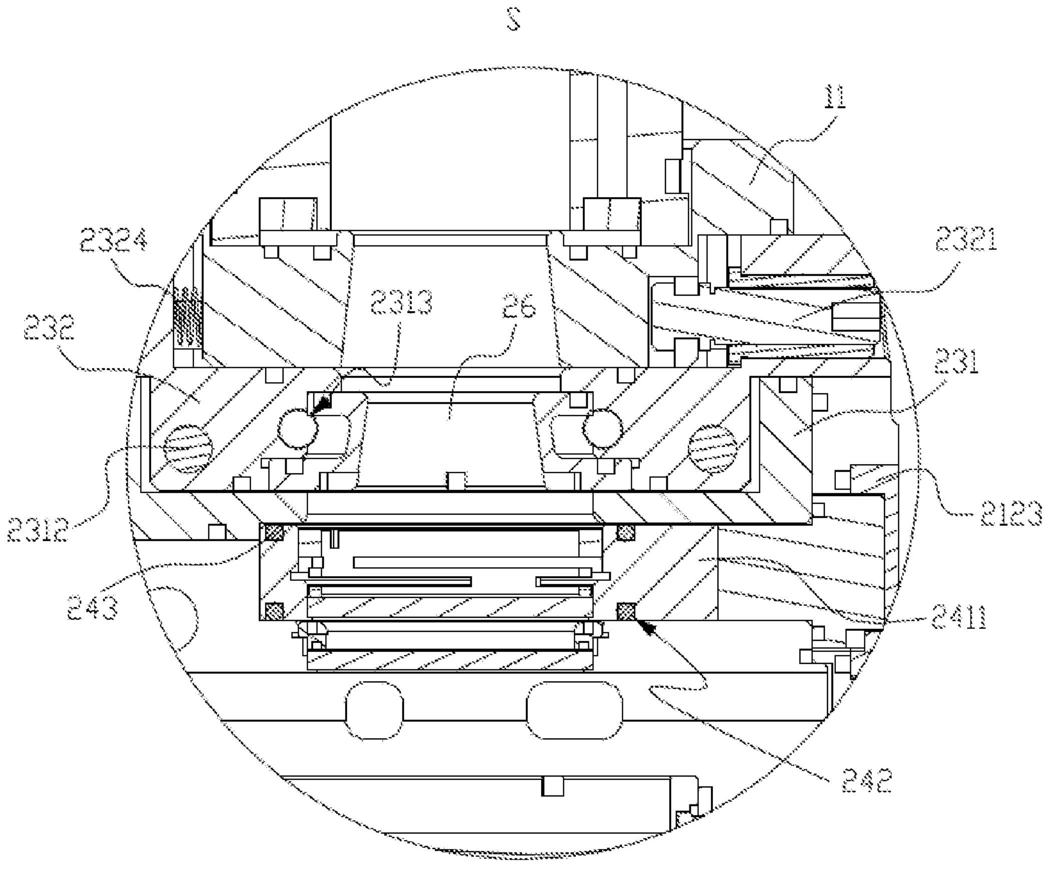
FIG. 7 is a partial view at S in FIG. 4.

In an embodiment, as shown in FIGS. 5 to 7, a first adjustment module 231 includes a first connection body, a pair of first guide columns 2312 and a pair of first mounting holes 2313 disposed on the first connection body, a pair of first springs 2314, and a first pin 2311. A second adjustment module 232 includes a second connection body, a pair of second guide columns 2322 and a pair of second mounting holes 2323 disposed on the second connection body, a pair of second springs 2324, and a second pin 2321.

The first connection body is disposed on the top surface of a frame. The top surface of the first connection body is provided with a recess for accommodating the second adjustment module 232. The first pin 2311, the pair of first guide columns 2312, and the pair of first mounting holes 2313 are separately disposed on the sidewall of the recess. The axes of the first pin 2311, the first guide columns 2312, and the first mounting holes 2313 separately extend along a first horizontal direction. The first guide columns 2312 penetrate through the recess of the first connection body. The pair of first mounting holes 2313 are used for mounting the pair of first springs 2314 in a one-to-one manner. The first springs 2314 can extend into the recess. The pair of first springs 2314 can be elastically deformed separately along the first horizontal direction.

The second connection body is disposed at the top of the first connection body. The second connection body can extend into the recess of the first connection body. The pair of first guide columns 2312 extend through the portion of the second connection body extending into the recess of the first connection body along the first horizontal direction. The portion of the pair of first springs 2314 exposing the recess of the first connection body abuts the second connection body. The first pin 2311 can abut the portion of the second connection body extending into the recess of the first connection body and push against the second connection body to elastically deform the pair of first springs 2314. Thus, the position of the optical path of an optical fiber assembly 1 in the first horizontal direction can be adjusted.

The top surface of the second connection body is provided with a recess for accommodating a first connection plate 11. The second pin 2321, the pair of second guide columns 2322, and the pair of second mounting holes 2323 are separately disposed on the sidewall of the recess. The axes of the second pin 2321, the second guide columns 2322, and the second mounting holes 2323 separately extend along a second horizontal direction perpendicular to the first horizontal direction. The second guide columns 2322 penetrate through the recess of the second connection body. The pair of second mounting holes 2323 are used for mounting the pair of second springs 2324 in a one-to-one manner. The second springs 2324 can extend into the recess. The pair of second springs 2324 can be elastically deformed separately along the second horizontal direction.

The first connection plate 11 is disposed at the top of the second connection body. The first connection plate 11 can extend into the recess of the second connection body. The pair of second guide columns 2322 extend through the portion of the first connection plate 11 extending into the recess of the second connection body along the second horizontal direction. The portion of the pair of second springs 2324 exposing the recess of the second connection body abuts the first connection plate 11. The second pin 2321 can abut the portion of the first connection plate 11 extending into the recess of the second connection body and push against the first connection plate 11 to elastically deform the pair of second springs 2324. Thus, the position of the optical path of the optical fiber assembly 1 in the second horizontal direction can be adjusted.

In an embodiment, a second adjustment module 232 also includes a filter assembly 26. The filter assembly 26 can absorb the light beams irradiated on a second connection body by the deviation of the optical path of an optical fiber assembly 1 along a first horizontal direction. The portion of the second connection body located near the filter assembly 26 is provided with a channel for fluid circulation to reduce the temperature of the filter assembly 26.

In this embodiment, the distance between the collimating lens 221 and the focusing lens 222 is fixed. To enable the laser cutting head to adjust the focal length of a laser beam, as shown in FIGS. 5 and 8 to 10, the drive assembly 27 is disposed on the frame, and the moving end of the drive assembly 27 can move in the first path along the extension direction of the first path. Thus, the distance between the barrel 22 and the nozzle assembly 3 can be adjusted, thereby implementing adjustment of the focal length of the laser beam of the laser cutting head.

In this embodiment, as shown in FIG. 5 and FIG. 8, the frame also includes a baseplate 2113, a cabin 213, and a base 214. As shown in FIG. 9, the drive assembly 27 includes a voice coil motor 271 and a pair of cross roller guides 272. The barrel 22 is secured to the front surface of the baseplate 2113. The voice coil motor 271 is secured to the back surface of the baseplate 2113. The baseplate 2113 is provided with a sliding chute penetrating through the baseplate 2113. The sliding chute extends along the extension direction of a first channel. The output end of the voice coil motor 271 is connected to a connector. The connector extends through the sliding chute on the baseplate 2113 and then is connected to the barrel 22. To prevent external dust from entering the first path from the sliding chute on the baseplate 2113, the voice coil motor 271 located on the back surface of the baseplate 2113 forms a sealing structure on the back surface of the baseplate 2113 through the cabin 213 and the base 214. Thus, the sliding chute of the baseplate 2113 can be sealed to the outside, thereby preventing particles in the dust or smoke outside from entering the first path through the sliding chute of the baseplate 2113 from the outside.

The baseplate 2113 is also provided with the cross roller guides 272. The cross roller guides 272 extend along the extension direction of the first channel. The barrel 22 is connected to moving ends of the cross roller guides 272. Thus, the voice coil motor 271 can drive the barrel 22 to move smoothly along the extension direction of the first channel.

Since the external operating environment of the laser cutting head is poor, the sealing portion between the lens assembly 2 and the outside may fail due to corrosion of the sealing ring. Thus, particles in the dust and smoke outside enter the first path and are attached to the first protective lens module 241 and the second protective lens module 251. Moreover, the first protective lens 2412 and the second protective lens 2512 may be burned due to high temperature. To solve the preceding problems, in an embodiment, as shown in FIG. 8, a lens assembly 2 also includes a dust detection apparatus 28. The dust detection apparatus 28 is disposed on the outer side surface of a barrel 22 opposite to the inner wall of a first path to detect the dust concentration in the first path. Thus, the device connected to a laser cutting head gives an alarm after the dust concentration exceeds a standard value, thereby protecting the service life of the lens assembly 2.

The dust detection apparatus 28 is provided with an air inlet 281 and an air outlet 282. A frame body 211 is provided with a partition between the air inlet 281 and the air outlet 282 to isolate the air inlet 281 and the air outlet 282. In a first channel, a frame is formed with an air duct flowing from the air inlet 281 through the top surface and bottom surface of the entire barrel 22 to the air outlet 282. Thus, airflow can carry particles attached to a first protective lens module 241 and a second protective lens module 251.

To further prolong the service life of the laser cutting head, as shown in FIG. 3, a mounting groove is separately disposed on the inner wall of the first path near the first protective lens module 241, the second protective lens module 251, the collimating lens 221, and the focusing lens 222. A temperature sensor 5 is disposed in each mounting groove. The temperature sensor 5 can be used for detecting the temperature of the lens located at a corresponding position in real time. Moreover, the device connected to the laser cutting head can give an alarm when the temperature of each lens is too high, thereby prolonging the service life of the laser cutting head.

What is claimed is:

1. A lens barrel, comprising:

a barrel provided with a channel penetrating through the barrel;

a pair of window lenses disposed at two ends of the channel in a one-to-one manner, wherein a sealing portion configured to seal the channel is disposed between the pair of window lenses and an inner wall of the channel;

a collimating lens and a focusing lens sequentially disposed in the channel; and a drive assembly, wherein the drive assembly comprises a voice coil motor and a pair of cross roller guides, a moving end of the pair of cross roller guides of the drive assembly is capable of moving along an extension direction of the channel, and the barrel is connected to the moving end of the pair of cross roller guides of the drive assembly.

2. The lens barrel according to claim 1, further comprising:

a pair of end covers each capable of exposing the channel, wherein the pair of end covers are configured to limit the pair of window lenses at two ports of the channel in a one-to-one manner; and a pair of wave springs, wherein the pair of end covers are configured to press the pair of wave springs against the pair of window lenses in a one-to-one manner.

3. The lens barrel according to claim 1, wherein a part of the barrel located between the collimating lens and the focusing lens is provided with a water cooling channel.

4. A laser cutting head, comprising an optical fiber assembly, a lens assembly, and a nozzle assembly disposed sequentially, wherein the lens assembly comprises a lens barrel, wherein the lens barrel comprises:

a barrel provided with a channel penetrating through the barrel;

a pair of window lenses disposed at two ends of the channel in a one-to-one manner, wherein a sealing portion configured to seal the channel is disposed between the pair of window lenses and an inner wall of the channel;

a collimating lens and a focusing lens sequentially disposed in the channel; and a drive assembly, wherein the drive assembly comprises a voice coil motor and a pair of cross roller guides, a moving end of the pair of cross roller guides of the drive assembly is capable of moving along an extension direction of the channel, and the barrel is connected to the moving end of the pair of cross roller guides of the drive assembly.

5. The laser cutting head according to claim 4, wherein the lens assembly further comprises a frame, the frame is provided with a first port and a second port configured to communicate with the optical fiber assembly and the nozzle assembly, respectively, a first path configured to communicate with the first port and the second port, and a first sealing portion and a second sealing portion configured to seal the first path with the optical fiber assembly and to seal the first path with the nozzle assembly, respectively, and the lens barrel is disposed in the first path.

6. The laser cutting head according to claim 5, wherein the first sealing portion comprises:

a first protective lens module configured to cover the first port and communicate an optical path with the first path by the optical fiber assembly, wherein top and bottom of the first protective lens module are separately provided with a first annular groove of a pair of first annular grooves;

a pair of first sealing rings disposed in the pair of first annular grooves in a one-to-one manner; and a first connection plate, wherein two ends of the first connection plate are connected to the frame and the optical fiber assembly in a one-to-one manner, the first connection plate is configured to press the first protective lens module against the frame so that the pair of the first sealing rings are pressed and limited in the pair of the first annular grooves in a one-to-one manner by the first connection plate.

7. The laser cutting head according to claim 6, wherein a first adjustment module and a second adjustment module are disposed between the first connection plate and the frame, the first adjustment module is secured to top of the frame, the second adjustment module is connected to a moving end of the first adjustment module, the first connection plate is connected to a moving end of the second adjustment module, the moving end of the first adjustment module is capable of moving along a first horizontal direction, and the moving end of the second adjustment module is capable of moving along a second horizontal direction perpendicular to the first horizontal direction.

8. The laser cutting head according to claim 5, wherein the second sealing portion comprises a second protective lens module configured to cover the second port and communicate an optical path from the first path to the nozzle assembly, and top and bottom of the second protective lens module are separately provided with a second annular groove of a pair of second annular grooves;

a pair of second sealing rings disposed in the pair of second annular grooves in a one-to-one manner; and a second connection plate, wherein two ends of the second connection plate are connected to the frame and the nozzle assembly in a one-to-one manner, the second connection plate is configured to press the second protective lens module against the frame so that the pair of the second sealing rings are pressed and limited in the pair of the second annular grooves in a one-to-one manner by the second connection plate.

9. The laser cutting head according to claim 5, wherein the lens assembly further comprises a dust detection apparatus, and the dust detection apparatus is disposed on an outer side surface of the barrel opposite to an inner wall of the first path.

10. The laser cutting head according to claim 5, wherein for each lens of the collimating lens and the focusing lens, a mounting groove is disposed on an inner wall of the first path located adjacent to the each lens, a temperature sensor is disposed in the mounting slot, and the temperature sensor is configured to detect a temperature of the each lens located at a corresponding position.

11. The laser cutting head according to claim 4, wherein the lens barrel further comprises:

a pair of end covers each capable of exposing the channel, wherein the pair of end covers are configured to limit the pair of window lenses at two ports of the channel in a one-to-one manner; and a pair of wave springs, wherein the pair of end covers are configured to press the pair of wave springs against the pair of window lenses in a one-to-one manner.

12. The laser cutting head according to claim 11, wherein the lens assembly further comprises a frame, the frame is provided with a first port and a second port configured to communicate with the optical fiber assembly and the nozzle assembly, respectively, a first path configured to communicate with the first port and the second port, and a first sealing portion and a second sealing portion configured to seal the first path with the optical fiber assembly and to seal the first path with the nozzle assembly, respectively, and the lens barrel is disposed in the first path.

13. The laser cutting head according to claim 12, wherein the first sealing portion comprises:

a first protective lens module configured to cover the first port and communicate an optical path with the first path by the optical fiber assembly, wherein top and bottom of the first protective lens module are separately provided with a first annular groove of a pair of first annular grooves;

a pair of first sealing rings disposed in the pair of first annular grooves in a one-to-one manner; and a first connection plate, wherein two ends of the first connection plate are connected to the frame and the optical fiber assembly in a one-to-one manner, the first connection plate is configured to press the first protective lens module against the frame so that the pair of the first sealing rings are pressed and limited in the pair of the first annular grooves in a one-to-one manner by the first connection plate.

14. The laser cutting head according to claim 13, wherein a first adjustment module and a second adjustment module are disposed between the first connection plate and the frame, the first adjustment module is secured to top of the frame, the second adjustment module is connected to a moving end of the first adjustment module, the first connection plate is connected to a moving end of the second adjustment module, the moving end of the first adjustment module is capable of moving along a first horizontal direction, and the moving end of the second adjustment module is capable of moving along a second horizontal direction perpendicular to the first horizontal direction.

15. The laser cutting head according to claim 12, wherein the second sealing portion comprises a second protective lens module configured to cover the second port and communicate an optical path from the first path to the nozzle assembly, and top and bottom of the second protective lens module are separately provided with a second annular groove of a pair of second annular grooves;

a pair of second sealing rings disposed in the pair of second annular grooves in a one-to-one manner; and a second connection plate, wherein two ends of the second connection plate are connected to the frame and the nozzle assembly in a one-to-one manner, the second connection plate is configured to press the second protective lens module against the frame so that the pair of the second sealing rings are pressed and limited in the pair of the second annular grooves in a one-to-one manner by the second connection plate.

16. The laser cutting head according to claim 12, wherein the lens assembly further comprises a dust detection apparatus, and the dust detection apparatus is disposed on an outer side surface of the barrel opposite to an inner wall of the first path.

17. The laser cutting head according to claim 12, wherein for each lens of the collimating lens and the focusing lens, a mounting groove is disposed on an inner wall of the first path located adjacent to the each lens, a temperature sensor is disposed in the mounting slot, and the temperature sensor is configured to detect a temperature of the each lens located at a corresponding position.

18. The laser cutting head according to claim 4, wherein a part of the barrel located between the collimating lens and the focusing lens is provided with a water cooling channel.

19. The laser cutting head according to claim 18, wherein the lens assembly further comprises a frame, the frame is provided with a first port and a second port configured to communicate with the optical fiber assembly and the nozzle assembly, respectively, a first path configured to communicate with the first port and the second port, and a first sealing portion and a second sealing portion configured to seal the first path with the optical fiber assembly and to seal the first path with the nozzle assembly, respectively, and the lens barrel is disposed in the first path.

20. The laser cutting head according to claim 19, wherein the first sealing portion comprises:

a first protective lens module configured to cover the first port and communicate an optical path with the first path by the optical fiber assembly, wherein top and bottom of the first protective lens module are separately provided with a first annular groove of a pair of first annular grooves;

a pair of first sealing rings disposed in the pair of first annular grooves in a one-to-one manner; and a first connection plate, wherein two ends of the first connection plate are connected to the frame and the optical fiber assembly in a one-to-one manner, the first connection plate is configured to press the first protective lens module against the frame so that the pair of the first sealing rings are pressed and limited in the pair of the first annular grooves in a one-to-one manner by the first connection plate.

* * * * *